(12) United States Patent
Minamoto et al.

(10) Patent No.: US 10,323,592 B2
(45) Date of Patent: *Jun. 18, 2019

(54) EXHAUST GAS RECIRCULATION (EGR) CONTROL DEVICE FOR ENGINE INCLUDING AN EGR AMOUNT INCREASE CONTROL

(71) Applicant: Mazda Motor Corporation, Aki-gun, Hiroshima (JP)

(72) Inventors: Hiroshi Minamoto, Hiroshima (JP); Kotaro Takahashi, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 85 days.

This patent is subject to a terminal disclaimer.

(21) Appl. No.: 14/821,134

(22) Filed: Aug. 7, 2015

(65) Prior Publication Data

US 2016/0069300 A1 Mar. 10, 2016

(30) Foreign Application Priority Data

Sep. 10, 2014 (JP) .................. 2014-184140

(51) Int. Cl.
*F02D 41/08* (2006.01)
*F02M 26/05* (2016.01)
(Continued)

(52) U.S. Cl.
CPC ........... *F02D 41/08* (2013.01); *F02D 41/005* (2013.01); *F02D 41/0065* (2013.01);
(Continued)

(58) Field of Classification Search
CPC .. F02D 41/08; F02D 41/0065; F02D 41/0225; F02D 41/005; F02D 41/0007; F02M 26/05; F02M 26/06; Y02T 10/47
See application file for complete search history.

(56) References Cited

U.S. PATENT DOCUMENTS 4,120,214 A * 10/1978 Toda ...................... F02M 26/57
477/100
8,443,766 B2 * 5/2013 Dolker ................ F02B 29/0493
123/198 D
(Continued)

FOREIGN PATENT DOCUMENTS

JP 2003193896 A 7/2003
JP 2008106658 A 5/2008
JP 2008196311 A 8/2008

*Primary Examiner* — David E Hamaoui
(74) *Attorney, Agent, or Firm* — Alleman Hall Creasman & Tuttle LLP

(57) ABSTRACT

An exhaust gas recirculation control device for an engine is provided. The device includes an EGR passage connecting an exhaust passage of the engine with an intake passage of the engine, an EGR amount adjustor for adjusting an EGR amount that is a recirculation amount of exhaust gas of the engine through the EGR passage, an adjustor controller for controlling the EGR adjustor to adjust the EGR amount, and a gear position detector for detecting a gear position of a transmission of a vehicle on which the engine is mounted. When the gear position detected by the gear position detector during an idle operation of the engine is a non-travel position, the adjustor controller performs an EGR amount increase control in which the EGR amount adjustor is controlled to increase the EGR amount to be higher than when the gear position is a travel position.

4 Claims, 5 Drawing Sheets

(51) Int. Cl.
*F02D 41/00* (2006.01)
*F02D 41/02* (2006.01)
*F02M 26/06* (2016.01)
*F02M 26/07* (2016.01)
*F02M 26/42* (2016.01)

(52) U.S. Cl.
CPC ......... *F02D 41/0225* (2013.01); *F02M 26/05* (2016.02); *F02M 26/06* (2016.02); *F02M 26/07* (2016.02); *F02M 26/42* (2016.02); *F02D 41/0007* (2013.01); *Y02T 10/47* (2013.01)

(56) References Cited

U.S. PATENT DOCUMENTS

| | | | |
|---|---|---|---|
| 9,404,409 B2* | 8/2016 | Pursifull | F01N 5/02 |
| 9,464,586 B2* | 10/2016 | Maekawa | F02D 41/0225 |
| 2010/0031939 A1* | 2/2010 | Ono | F02D 41/08 |
| | | | 123/568.22 |
| 2010/0186727 A1* | 7/2010 | Kaneko | F02D 21/08 |
| | | | 123/568.21 |
| 2014/0216017 A1* | 8/2014 | Shirai | B01D 53/9409 |
| | | | 60/297 |

* cited by examiner

EXHAUST GAS RECIRCULATION (EGR) CONTROL DEVICE FOR ENGINE INCLUDING AN EGR AMOUNT INCREASE CONTROL

BACKGROUND

The present invention relates to an exhaust gas recirculation (EGR) control device for an engine.

Conventionally, an EGR passage is formed to connect an exhaust passage with an intake passage of an engine, so as to recirculate a part of the exhaust gas of the engine from the exhaust passage to the intake passage. For example, JP2008-106658A discloses such an EGR passage. The EGR passage includes a high-pressure EGR passage and a low-pressure EGR passage. The high-pressure EGR passage connects an exhaust passage at a position upstream of a turbine of an exhaust turbocharger, with an intake passage at a position downstream of a compressor of the exhaust turbocharger. The low-pressure EGR passage connects the exhaust passage at a position downstream of the turbine of the exhaust turbocharger, with the intake passage at a position upstream of the compressor of the exhaust turbocharger. An idle operation continuation period of time of the engine is measured, and when the idle operation continuation time period is longer than a predetermined period of time, a low-pressure EGR amount which is a recirculation amount of exhaust gas through the low-pressure EGR passage is reduced and a high-pressure EGR amount which is a recirculation amount of exhaust gas through the high-pressure EGR passage is increased. Thus, a temperature decrease of a combustion chamber of the engine caused by a temperature decrease of low-pressure EGR gas which is recirculated by the low-pressure EGR passage is reduced.

Incidentally, in engines with small emission amounts, since heat generation is low, in a case where a configuration of supplying cooling water of the engine to a heater core of an air conditioner is adopted, it is difficult to supply a sufficient amount of heat to the heater core, causing a problem of degradation in heating performance, particularly during an idle operation of the engine.

Thus, an increase to the EGR amount, particularly the high-pressure EGR amount as JP2008-106658A, can be considered. However, if the EGR amount is increased with insufficient consideration, a problem arises that the emission performance degrades when accelerating the engine from the idle operation (particularly when accelerating the engine in the start of a vehicle on which the engine is mounted). Whereas if a fuel injection amount is reduced to avoid the degradation in the emission performance when accelerating the engine, the engine acceleration performance degrades.

SUMMARY

The present invention is made in view of the above situations and aims to improve heating performance during an idle operation of an engine, while reducing degradation in emission performance and an engine acceleration performance when accelerating the engine from the idle operation.

According to one aspect of the present invention, an exhaust gas recirculation control device for an engine is provided. The exhaust gas recirculation control device includes an EGR passage connecting an exhaust passage of the engine with an intake passage of the engine, an EGR amount adjustor for adjusting an EGR amount that is a recirculation amount of exhaust gas of the engine through the EGR passage, an adjustor controller for controlling the EGR adjustor to adjust the EGR amount, and a gear position detector for detecting a gear position of a transmission of a vehicle on which the engine is mounted. When the gear position detected by the gear position detector during an idle operation of the engine is a non-travel position, the adjustor controller performs an EGR amount increase control in which the EGR amount adjustor is controlled to increase the EGR amount to be larger than when the gear position is a travel position.

According to the above configuration, when the gear position is the travel position (e.g., D-range or R-range of an automatic transmission, a first gear position or the like of a manual transmission), there is a high possibility of engine acceleration (possibility of a vehicle start). Therefore, by reducing the EGR amount to be smaller than when the gear position is the non-travel position (e.g., P-range or N-range of the automatic transmission, a neutral position of the manual transmission), degradation in emission performance and engine acceleration performance can be suppressed when the engine is accelerated from the idle operation while the gear position is the travel position (the vehicle start). On the other hand, in the idle operation while the gear position is the non-travel position, there is a low possibility of the engine acceleration (possibility of the vehicle start). Therefore, a heat release rate for an exhaust system is reduced by increasing the EGR amount and the temperature of the coolant for the engine can be increased. Thus, the heating performance can be improved. Particularly in a situation where the vehicle is stopped and a person on board rests inside the cabin in wintertime, since the gear position is generally set to the non-travel position, even if the vehicle is in the idle operation for a while, sufficient heating performance can be secured and the person on board can rest comfortably inside the cabin.

A turbine of an exhaust turbocharger is preferably disposed in the exhaust passage. A compressor of the exhaust turbocharger is preferably disposed in the intake passage. The EGR passage preferably includes a high-pressure EGR passage connecting the exhaust passage at a position upstream of the turbine, with the intake passage at a position downstream of the compressor, and a low-pressure EGR passage connecting the exhaust passage at a position downstream of the turbine, with the intake passage at a position upstream of the compressor. The EGR amount adjuster preferably includes a high-pressure EGR amount adjuster for adjusting a high-pressure EGR amount that is a recirculation amount of the exhaust gas of the engine through the high-pressure EGR passage, and a low-pressure EGR amount adjuster for adjusting a low-pressure EGR amount that is a recirculation amount of the exhaust gas of the engine through the low-pressure EGR passage. During the idle operation of the engine, the adjuster controller preferably controls the high-pressure and low-pressure EGR adjusters to recirculate the exhaust gas only by the high-pressure EGR passage. In the EGR amount increase control, when the gear position detected by the gear position detector is the non-travel position during the idle operation of the engine, the high-pressure and low-pressure EGR adjusters are preferably controlled to increase the high-pressure EGR amount to be higher than when the gear position is the travel position.

Thus, in the idle operation, the heat release to the exhaust system can be reduced as much as possible even if the gear position is the travel position, and the heating performance can be further improved when the gear position is the non-travel position.

The device preferably further includes an outdoor air temperature detector for detecting a temperature of outdoor air. When the temperature of the outdoor air detected by the outdoor air temperature detector is higher than a predetermined temperature during the idle operation of the engine, the adjuster controller preferably does not perform the EGR amount increase control even when the gear position detected by the gear position detector is the non-travel position.

Thus, when the temperature of the outdoor air is higher than the predetermined temperature, the EGR amount increase control is not performed even when the gear position is the non-travel position. Therefore, even if the gear position is quickly switched to the travel position from the non-travel position and the engine is accelerated (started), the degradation in the emission performance and the engine acceleration performance can be suppressed. Note that when the temperature of the outdoor air is higher than the predetermined temperature, a significant problem does not arise regarding the heating performance even without the EGR amount increase control.

The device preferably further includes an engine coolant temperature detector for detecting a temperature of a coolant for the engine. When the temperature of the coolant detected by the engine coolant temperature detector is lower than a predetermined temperature during the idle operation of the engine, the adjuster controller preferably does not perform the EGR amount increase control even when the gear position detected by the gear position detector is the non-travel position.

That is, in a cold start of the engine, if the EGR amount increase control is performed while the coolant temperature is in a low state, which is lower than the predetermined temperature (e.g., between 40° C. and 50° C.), a combustion stability of the engine degrades. However, by not performing the EGR amount increase control here, the combustion stability of the engine can be maintained. Further, by performing the EGR amount increase control when the coolant temperature exceeds the predetermined temperature, the sufficient heating performance can be secured while maintaining the combustion stability of the engine.

The device preferably further includes a vehicle stop determiner for determining whether the vehicle is stopped. When the vehicle is not determined as stopped by the vehicle stop determiner, the adjuster controller preferably does not perform the EGR amount increase control even when the gear position detected by the gear position detector is the non-travel position.

That is, when the vehicle is traveling, even if the gear position is set to the non-travel position (N-range of the automatic transmission, the neutral position of the manual transmission), there is a high possibility that the gear position will be imminently set to the travel position and the engine will be accelerated. Therefore, by not performing the EGR amount increase control, the degradation in the emission performance and the engine acceleration performance when accelerating the engine can be suppressed. Note that, even without the EGR amount increase control as above, a significant problem does not arise regarding the heating performance, since the gear position is rarely set to the non-travel position when the vehicle is traveling, and even if the gear position is set to the non-travel position, it does not remain at the non-travel position for long.

DETAILED DESCRIPTION OF EMBODIMENT

Hereinafter, one embodiment of the present invention is described with reference to the appended drawings.

Figure 1:
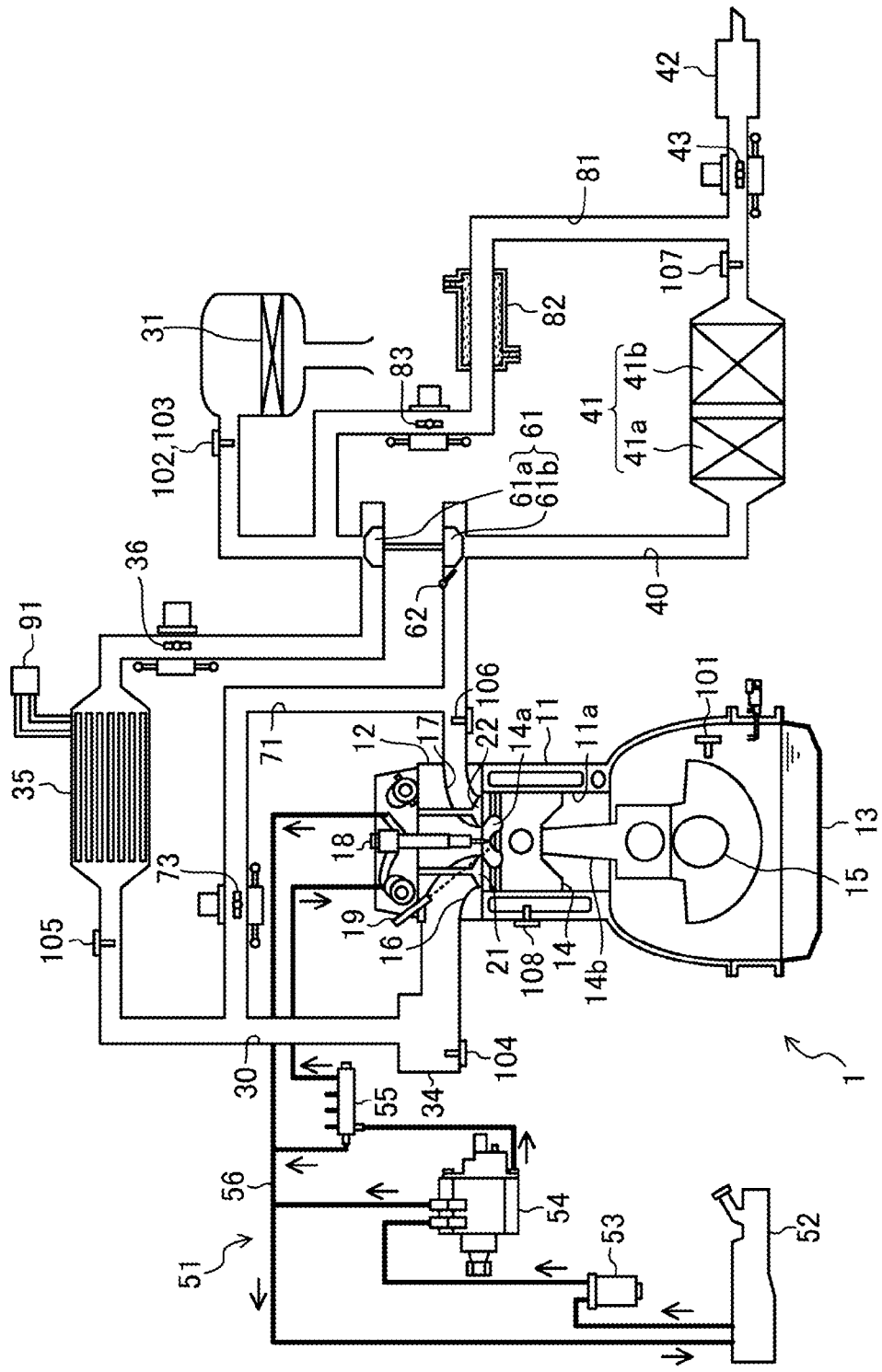
FIG. 1 is a view illustrating a schematic configuration of an engine controlled by an exhaust gas recirculation control device according to one embodiment of the present invention.

FIG. 1 is a view illustrating a schematic configuration of an engine 1 controlled by an exhaust gas recirculation control device according to one embodiment of the present invention. The engine 1 is a diesel engine installed in a vehicle including an automatic transmission. The engine 1 includes a cylinder block 11 formed with a plurality of cylinders 11a (only one cylinder is illustrated in FIG. 1), a cylinder head 12 disposed on the cylinder block 11, and an oil pan 13 disposed below the cylinder block 11, where a lubricant is stored. Inside each of the cylinders 11a of the engine 1, a reciprocatable piston 14 is fitted, and a cavity forming a deep-bowl combustion chamber 14a is formed in a top surface of the piston 14. The pistons 14 are coupled to a crankshaft 15 via connecting rods 14b, respectively.

In the cylinder head 12, an intake port 16 and an exhaust port 17 are formed for each cylinder 11a, and an intake valve 21 for opening and closing the intake port 16 on the combustion chamber 14a side and an exhaust valve 22 for opening and closing the exhaust port 17 on the combustion chamber 14a side are provided for each cylinder 11a.

In the cylinder head 12, an injector 18 for injecting the fuel and a glow plug 19 for heating gas sucked into the cylinder 11a in a cold start of the engine 1 to improve ignitability of fuel are provided for each cylinder 11a. The injector 18 is arranged such that its fuel injection port is oriented toward the inside of the combustion chamber 14a from a ceiling surface of the combustion chamber 14a, so that it directly supplies the fuel into the combustion chamber 14a.

The fuel is supplied from a fuel tank 52 to the injector 18 via a fuel supply system 51. The fuel supply system 51 includes an electrically-operated low-pressure fuel pump (not illustrated) disposed within the fuel tank 52, a fuel filter 53, a high-pressure fuel pump 54, and a common rail 55. The high-pressure fuel pump 54 pumps the fuel supplied at a low pressure from the fuel tank 52 via the low-pressure fuel pump and the fuel filter 53, at a high pressure, to the common rail 55. The common rail 55 stores the pumped fuel at a high pressure. Further, when the injector 18 is activated, the fuel stored in the common rail 55 is injected from the injector 18 into the combustion chamber 14a. Note that a surplus amount of fuel in any of the low-pressure fuel pump, the high-pressure fuel pump 54, the common rail 55, and the injector 18 is (a surplus amount of fuel in the low-pressure fuel pump is directly) returned back to the fuel tank 52 via a return passage 56.

The high-pressure fuel pump 54 is driven by a rotational member (e.g., a camshaft) of the engine 1. The high-pressure fuel pump 54 is provided therein with a pressure adjusting valve configured with an electromagnetic valve, so that a pressure of the fuel to be supplied to the common rail 55 from the high-pressure fuel pump 54 (a pressure of the fuel stored in the common rail 55), in other words, a pressure of the fuel to be injected from the injector 18 (fuel pressure), is adjusted by the pressure adjusting valve.

To one side surface of the engine 1, an intake passage 30 is connected to communicate with the intake ports 16 of the respective cylinders 11a. To the other side surface of the engine 1, an exhaust passage 40 is connected to guide out burned gas (exhaust gas) discharged from the combustion chambers 14a of the cylinders 11a. An exhaust turbocharger 61 for turbocharging intake air (including exhaust gas recirculated by a low-pressure EGR passage 81 described later) is disposed in the intake and exhaust passages 30 and 40.

An air cleaner 31 for filtering intake air is disposed in an upstream end part of the intake passage 30. A surge tank 34 is disposed near a downstream end of the intake passage 30. A part of the intake passage 30 downstream of the surge tank 34 is branched to be independent passages extending toward the respective cylinders 11a, and downstream ends of the independent passages are connected with the intake ports 16 of the cylinders 11a, respectively.

A compressor 61a of the exhaust turbocharger 61, an intake shutter valve 36, and an intercooler 35 for cooling gas compressed by the compressor 61a are disposed in the intake passage 30 in this order from the upstream side, between the air cleaner 31 and the surge tank 34. Although the intake shutter valve 36 is basically fully opened, it may be controlled to an opening smaller than the fully opened state so as to secure a recirculation amount of exhaust gas through a high-pressure EGR passage 71 described later. The intercooler 35 is disposed at a position of the intake passage 30 downstream of the compressor 61a, and cools the gas by supplying a coolant (different coolant from a coolant for the engine 1) from an electric water pump 91.

An upstream part of the exhaust passage 40 is comprised of an exhaust manifold having independent passages extending to the respective cylinders 11a and connected with respective external ends of the exhaust ports 17, and a manifold section where the respective independent passages are collected together. In a part of the exhaust passage 40 downstream of the exhaust manifold, a turbine 61b of the exhaust turbocharger 61, an exhaust emission control system 41 for purifying hazardous components within the exhaust gas of the engine 1, and a silencer 42 are arranged in this order from the upstream side.

The exhaust emission control system 41 includes an oxidation catalyst 41a and a diesel particulate filter (hereinafter, referred to as the "filter") 41b, which are arranged in this order from the upstream side. The oxidation catalyst 41a has an oxidation catalyst carrying platinum alone or platinum combined with palladium, etc., so as to stimulate a reaction of producing $CO_2$ and $H_2O$ by oxidation between CO and HC within the exhaust gas. Moreover, the filter 41b captures particulate matter (e.g., soot) contained within the exhaust gas of the engine 1. Note that the filter 41b may be coated with the oxidation catalyst.

The exhaust turbocharger 61 includes the compressor 61a disposed in the intake passage 30 as described above and the turbine 61b disposed in the exhaust passage 40 as described above. The turbine 61b rotates by the exhaust gas flow, and the compressor 61a coupled to the turbine 61b is operated by the rotation of the turbine 61b. A variable geometry turbine (VGT) throttle valve 62 is provided in the exhaust passage 40 near the upstream side of the turbine 61b. By controlling an opening (throttle amount) of the VGT throttle valve 62, a flow speed of the exhaust gas to the turbine 61b can be adjusted. Thus, a rotational speed of the turbine 61b which rotates by the exhaust gas flow, in other words, a compression ratio of the compressor 61a of the exhaust turbocharger 61 (a ratio of a gas pressure immediately after flowing out from the compressor 61a with respect to a gas pressure immediately before flowing into the compressor 61a), can be adjusted.

The engine 1 is designed to recirculate part of the exhaust gas from the exhaust passage 40 to the intake passage 30. The high-pressure EGR passage 71 and the low-pressure EGR passage 81 are formed to perform the exhaust gas recirculation.

The high-pressure EGR passage 71 connects the exhaust passage 40 at a position between the exhaust manifold and the turbine 61b of the exhaust turbocharger 61 (i.e., a position upstream of the turbine 61b of the exhaust turbocharger 61), with the intake passage 30 at a position between the surge tank 34 and the intercooler 35 (i.e., a position downstream of the intercooler 35). A high-pressure EGR valve 73 for changing a cross-sectional area of the high-pressure EGR passage 71 is disposed in the high-pressure EGR passage 71. A recirculation amount of the exhaust gas through the high-pressure EGR passage 71 (hereinafter, referred to as the "high-pressure EGR amount") is adjusted by the high-pressure EGR valve 73.

The low-pressure EGR passage 81 connects the exhaust passage 40 at a position between the exhaust emission control system 41 and the silencer 42 (i.e., a position downstream of the turbine 61b of the exhaust turbocharger 61), with the intake passage 30 at a position between the compressor 61a of the exhaust turbocharger 61 and the air cleaner 31 (i.e., a position upstream of the compressor 61a of the exhaust turbocharger 61). A low-pressure EGR cooler 82 for cooling the exhaust gas passing through the low-pressure EGR passage 81 is disposed in the low-pressure EGR passage 81. The low-pressure EGR cooler 82 cools the exhaust gas by supplying the coolant for the engine 1. Moreover, a low-pressure EGR valve 83 for changing a cross-sectional area of the low-pressure EGR passage 81 is disposed at a position of the low-pressure EGR passage 81 downstream of the low-pressure EGR cooler 82.

An exhaust shutter valve 43 is provided in the exhaust passage 40, downstream of the connecting position thereof with the low-pressure EGR passage 81 (and upstream of the silencer 42). The exhaust shutter valve 43 changes a cross-sectional area of the exhaust passage 40 at the disposed position of the exhaust shutter valve 43. When the cross-sectional area (the opening of the exhaust shutter valve 43) is reduced, a pressure of the connecting position of the exhaust passage 40 with the low-pressure EGR passage 81 (a flow-in pressure of the exhaust gas flowing into the low-pressure EGR passage 81) is increased, and a difference between the flow-in pressure of the exhaust gas flowing into the low-pressure EGR passage 81 and a flow-out pressure of the exhaust gas flowing out therefrom (a pressure at the connecting position of the intake passage 30 with the low-pressure EGR passage 81) becomes large. Therefore, by controlling the openings of the low-pressure EGR valve 83 and the exhaust shutter valve 43, a recirculation amount of exhaust gas through the low-pressure EGR passage 81 (hereinafter, referred to as the "low-pressure EGR amount") is adjusted.

The engine 1 is provided with an engine speed sensor 101 for detecting a rotational speed of the engine 1 (hereinafter, referred to as the "engine speed") by detecting a rotational angular position of a crankshaft 15.

Moreover, an airflow sensor 102 for detecting a flow rate of intake air (fresh air) sucked into the intake passage 30 and an intake temperature sensor 103 for detecting a temperature of the intake air (intake temperature) are disposed at a position of the intake passage 30 near a downstream end of the air cleaner 31 (upstream of the connecting position of the low-pressure EGR passage 81). The intake temperature can be considered as an outdoor air temperature in the vicinity of the vehicle. Further, an intake gas temperature sensor 104 for detecting a temperature of the gas sucked into the cylinders 11a of the engine 1 is disposed in the surge tank 34, and an intake pressure sensor 105 for detecting a pressure of the intake air at a position of the intake passage 30 near a downstream end of the intercooler 35 (substantially the same as a pressure of gas within the surge tank 34) is disposed at this position.

Further, an exhaust pressure sensor 106 for detecting a pressure of the exhaust gas discharged from the engine 1 is disposed at a position of the exhaust passage 40 upstream of the connecting position thereof with the high-pressure EGR passage 71 (and downstream of the exhaust manifold). Moreover, an exhaust temperature sensor 107 for detecting a temperature of the gas at a position of the exhaust passage 40 between the exhaust emission control system 41 and the connecting position with the low-pressure EGR passage 81 is provided at this position.

Moreover, an engine coolant temperature sensor 108 for detecting a temperature of the coolant for the engine 1 is provided to the cylinder block 11 of the engine 1.

The engine 1 configured as above is controlled by a control unit 100. The control unit 100 is a controller based on a well-known microcomputer, and includes a central processing unit (CPU) for executing program(s), a memory comprised of, for example, a RAM and/or a ROM for storing the program(s) and data, and an input/output (I/O) bus for inputting and outputting electric signals.

Figure 2:
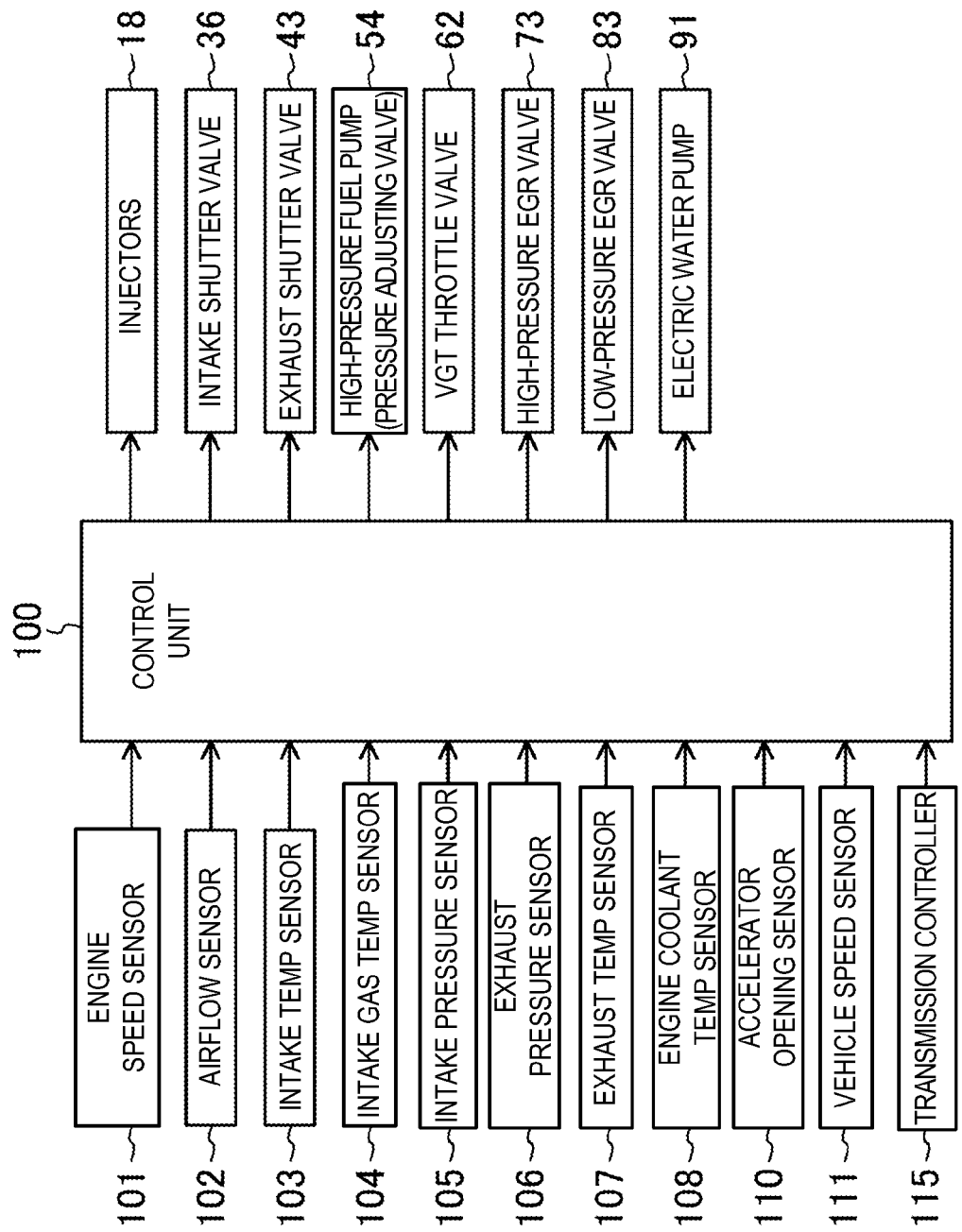
FIG. 2 is a block diagram illustrating a configuration of a control system of the exhaust gas recirculation control device.

As illustrated in FIG. 2, the control unit 100 receives signals indicating values from the engine speed sensor 101, the airflow sensor 102, the intake temperature sensor 103, the intake gas temperature sensor 104, the intake pressure sensor 105, the exhaust pressure sensor 106, the exhaust temperature sensor 107, the engine coolant temperature sensor 108, etc. Moreover, as illustrated only in FIG. 2, the control unit 100 receives signals indicating values from an accelerator opening sensor 110 for detecting an accelerator opening corresponding to an operation amount of an acceleration pedal (not illustrated) of the vehicle, and a vehicle speed sensor 111 for detecting a speed of the vehicle. Furthermore, the control unit 100 receives, from a transmission controller 115 for controlling the automatic transmission of the vehicle, a signal relating to information of a current gear range of the automation transmission. Note that the signal relating to information of the current gear range of the automation transmission may be inputted to the control unit 100 from an inhibitor switch of the automatic transmission.

Further, based on the received signals, the control unit 100 controls the injectors 18, the intake shutter valve 36, the exhaust shutter valve 43, the high-pressure fuel pump 54 (pressure adjusting valve to be specific), the VGT throttle valve 62, the high-pressure EGR valve 73, the low-pressure EGR valve 83, the electric water pump 91, etc.

Figure 3:
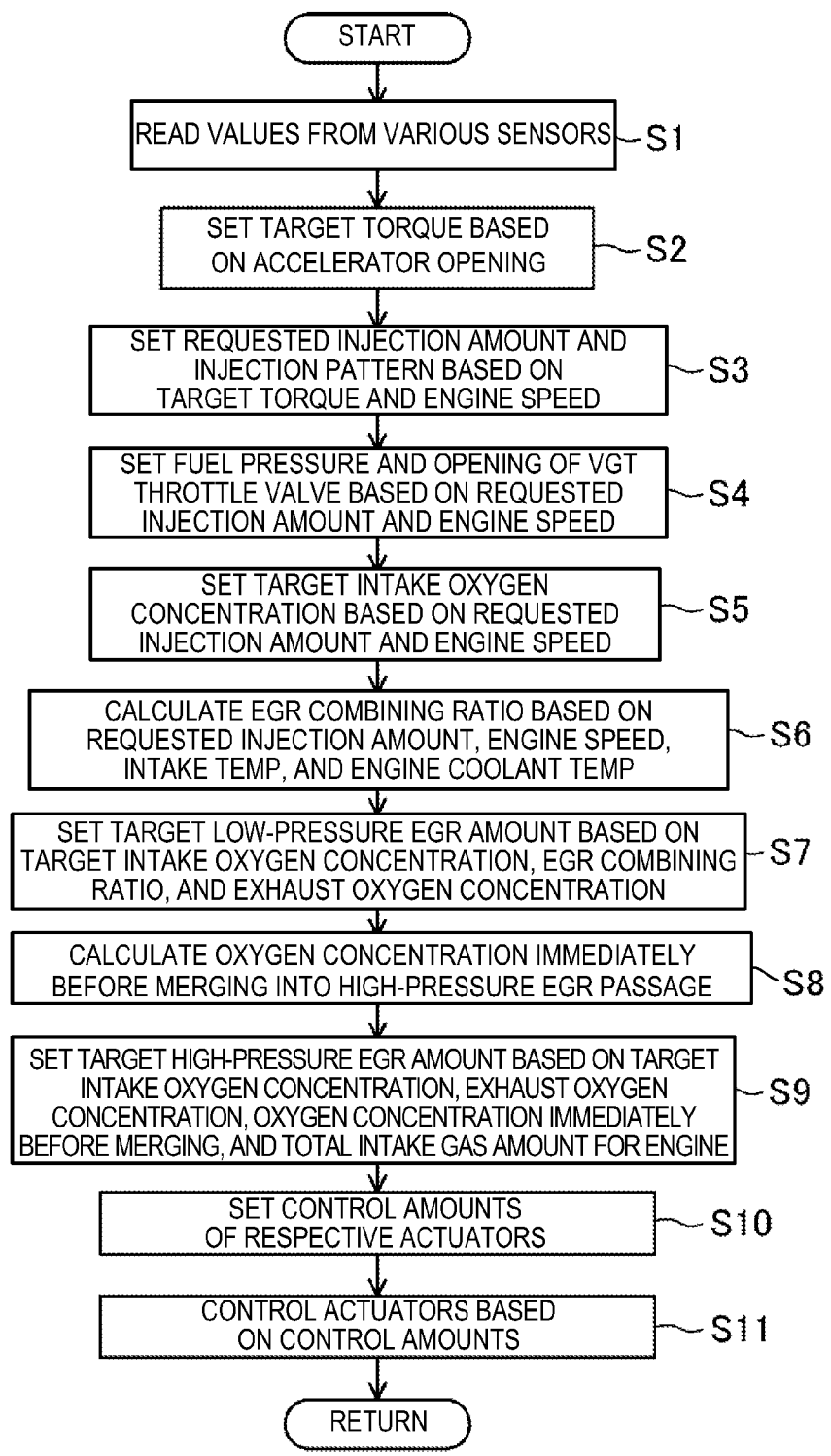
FIG. 3 is a flowchart illustrating a basic control of the engine performed by a control unit.

Here, a basic control of the engine 1 performed by the control unit 100 is described based on the flowchart of FIG. 3.

First, at S1, the values are read from the various sensors, and next, at S2, a target torque is set based on the accelerator opening obtained by the accelerator opening sensor 110.

Subsequently at S3, a requested injection amount which is a fuel amount to be injected from each injector 18 (a fuel amount to be supplied to the engine 1 (cylinders 11a)) and an injection pattern are set based on the target torque and the engine speed obtained by the engine speed sensor 101. The injection pattern sets fuel amounts and injection timings thereof in a main injection for causing main combustion, a pre-injection performed before the main injection and for causing pre-combustion, a pilot injection performed before the pre-injection and for stimulating the pre-combustion, a post injection for causing post combustion continuously from the main combustion, etc., respectively. Any one or more of the injection amounts of the pilot, pre-, and post injections may be zero, and in this case, the corresponding injection is not performed.

Next, at S4, the pressure of the fuel (fuel pressure) to be injected by each injector 18 and the opening of the VGT throttle valve 62 are set based on the requested injection amount and the engine speed.

Subsequently at S5, a target intake oxygen concentration which is a target value of an oxygen concentration of the entirety of the intake gas sucked into the engine 1 (cylinders 11a) is set based on the requested injection amount and the engine speed.

Next, at S6, an EGR combining ratio which is a ratio between the high-pressure EGR amount and the low-pressure EGR amount is set based on the requested injection amount, the engine speed, the intake temperature obtained by the intake temperature sensor 103 and the engine coolant temperature obtained by the engine coolant temperature sensor 108. Either one of the high-pressure EGR amount and the low-pressure EGR amount may be zero in the EGR combining ratio.

Figure 4:
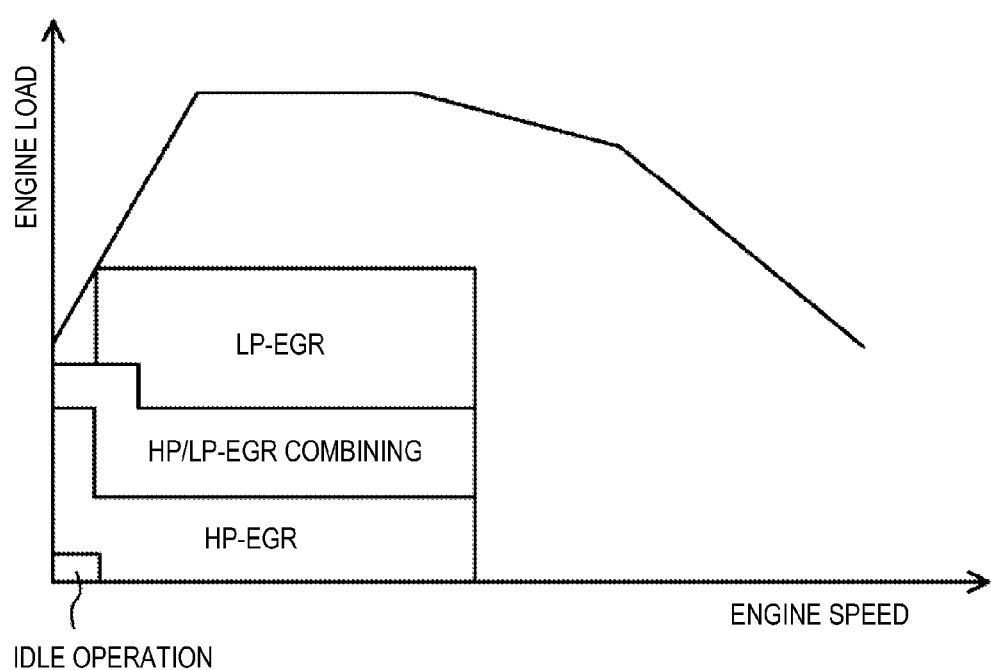
FIG. 4 is a chart schematically illustrating an "HP-EGR" range, an "LP-EGR" range, an "HP/LP-EGR combining" range, and an "idle" range within an entire engine operation range.

As a result of setting the EGR combining ratio at S6, within an entire engine operation range indicated by engine speed and engine load (corresponding to the requested injection amount), an "HP-EGR" range (high-pressure EGR range) in which the recirculation of the exhaust gas is performed only by the high-pressure EGR passage 71, an "LP-EGR" range (low-pressure EGR range) in which the recirculation of the exhaust gas is performed only by the low-pressure EGR passage 81, and an "HP/LP-EGR combining" range (high/low-pressure EGR combining range) in which the recirculation of the exhaust gas is performed by both of the high-pressure EGR passage 71 and the low-pressure EGR passage 81 are schematically defined as illustrated in FIG. 4. In the "HP/LP-EGR combining" range, the ratio of the high-pressure EGR amount becomes smaller and the ratio of the low-pressure EGR amount becomes larger as the operating state becomes closer to the "LP-EGR" range. Moreover, an "idle operation" range in which the recirculation of the exhaust gas is performed only by the high-pressure EGR passage 71 during an idle operation is set within the "HP-EGR" range. The control performed within the "idle operation" range varies depending on the gear range of the automatic transmission, as described later.

Next, at S7, a target low-pressure EGR amount which is a target value of the low-pressure EGR amount is set based on the target intake oxygen concentration, the EGR combining ratio, and an exhaust oxygen concentration which is an oxygen concentration within the exhaust gas. Specifically, a target total EGR amount which is a target value of a total EGR amount (including the low-pressure EGR amount and the high-pressure EGR amount) is calculated based on the target intake oxygen concentration and the exhaust oxygen concentration, and the target low-pressure EGR amount is set based on the target total EGR amount and the EGR combining ratio. In this embodiment, the exhaust oxygen concentration is a value calculated based on the target intake oxygen concentration and an oxygen amount used for the combustion of the fuel inside the cylinder 11a. Note that instead of calculating the exhaust oxygen concentration, the exhaust oxygen concentration may be detected by an $O_2$ sensor provided to the exhaust passage 40.

Subsequently at S8, an oxygen concentration of the gas at a position of the intake passage 30 immediately before merging into the high-pressure EGR passage 71 (a sum of an oxygen concentration of the fresh air and an oxygen concentration of the exhaust gas actually recirculated by the low-pressure EGR passage 81) is calculated based on the target low-pressure EGR amount. Here, the oxygen concentration immediately before the merging is calculated by taking into consideration a time length required for the exhaust gas recirculated by the low-pressure EGR passage 81 to reach the position of the intake passage 30 immediately before merging into the high-pressure EGR passage 71.

Next, at S9, a target high-pressure EGR amount is set based on the target intake oxygen concentration, the exhaust oxygen concentration, the oxygen concentration immediately before the merging, and a total intake gas amount for the engine 1 (cylinders 11a). Specifically, although the target high-pressure EGR amount can also be set in addition to the target low-pressure EGR amount based on the EGR combining ratio at S8, in this case, since it is time taking for the exhaust gas recirculated by the low-pressure EGR passage 81 to reach the position of the intake passage 30 immediately before merging into the high-pressure EGR passage 71, the time delay causes a lack of low-pressure EGR amount and, thus, the target high-pressure EGR amount is set to compensate the lack of low-pressure EGR amount with the high-pressure EGR amount. In this regard, in this embodiment, the target high-pressure EGR amount is set to be a value calculated based on the target intake oxygen concentration determined according to the operating state of the engine 1, the oxygen concentration of the gas immediately before merging with the high-pressure EGR passage 71 calculated by taking the time delay caused until the exhaust gas recirculated by the low-pressure EGR passage 81 reaches the position of the intake passage 30 merging into the high-pressure EGR passage 71 from the exhaust port 17 into consideration, the exhaust oxygen concentration, and the total intake gas amount for the engine 1. An actual low-pressure EGR amount which is an actual value of the recirculation amount through the low-pressure EGR passage 81 is calculated by subtracting the fresh air amount detected by the airflow sensor 102 (also subtracting an actual high-pressure EGR amount which is an actual value of the recirculation amount through the high-pressure EGR passage 71 within the "HP/LP-EGR combining" range) from the total intake gas amount for the engine 1 (cylinders 11a), while taking the time delay into consideration. The total intake gas amount can be calculated based on the gas temperature detected by the intake gas temperature sensor 104 and the gas pressure detected by the intake pressure sensor 105. The actual high-pressure EGR amount can be calculated based on a difference in detected pressure between the intake pressure sensor 105 and the exhaust pressure sensor 106 and the actual opening of the high-pressure EGR valve 73.

Subsequently at S10, control amounts of actuators of the injectors 18, the intake shutter valve 36, the exhaust shutter valve 43, the high-pressure fuel pump 54 (pressure adjusting valve), the VGT throttle valve 62, the high-pressure EGR valve 73, the low-pressure EGR valve 83, the electric water pump 91, etc., are set based on the above settings.

Next, at S11, the actuators are controlled based on the control amounts and then the routine returns to the start of the control of the engine 1.

Next, opening controls of the high-pressure EGR valve 73, the low-pressure EGR valve 83, and the exhaust shutter valve 43 performed by the control unit 100 are described.

The control unit 100 controls the opening of the high-pressure EGR valve 73 so that the high-pressure EGR amount becomes the target high-pressure EGR amount (the target high-pressure EGR amount set at S9). Specifically, the control unit 100 sets the opening of the high-pressure EGR valve 73 to the opening at which the target high-pressure EGR amount can be obtained, based on the difference in detected pressure between the intake pressure sensor 105 and the exhaust pressure sensor 106.

Moreover, the control unit 100 controls the openings of the low-pressure EGR valve 83 and the exhaust shutter valve 43 so that the low-pressure EGR amount becomes the target low-pressure EGR amount (the target low-pressure EGR amount set at S7). In the control, when the set target low-pressure EGR amount is equivalent to or smaller than the low-pressure EGR amount which can be recirculated when the low-pressure EGR valve 83 and the exhaust shutter valve 43 are fully opened, the low-pressure EGR amount is controlled by controlling the low-pressure EGR valve 83 while the exhaust shutter valve 43 is fixed to the fully opened state (increasing the opening of the low-pressure EGR valve 83 to be larger as the target low-pressure EGR amount is larger). When the target low-pressure EGR amount is larger than the low-pressure EGR amount which can be recirculated when the low-pressure EGR valve 83 and the exhaust shutter valve 43 are fully opened, the low-pressure EGR amount is controlled by controlling the exhaust shutter valve 43 while the low-pressure EGR valve 83 is fixed to the fully opened state (reducing the opening of the exhaust shutter valve 43 to be smaller as the target low-pressure EGR amount is larger).

Here, the engine 1 of this embodiment is an engine with a small emission amount, and the heat generation is low. Since the engine 1 is designed such that the coolant for the engine 1 is supplied to a heater core of an air conditioner to warm up the cabin, if the heat generation of the engine is as low as the engine 1, a problem arises that heating performance degrades, particularly during an idle operation. During the idle operation of the engine 1 (within the "idle operation" range), the exhaust gas is recirculated only by the high-pressure EGR passage 71 similar to the "HP-EGR" range. However, it is difficult to secure the heating performance during the idle operation by simply controlling the high-pressure EGR amount to the target high-pressure EGR amount set at S9. Therefore, it can be considered to increase the high-pressure EGR amount to be larger than the target high-pressure EGR amount set at S9 during the idle operation, so as to reduce the degradation in the heating performance as described above.

Here, if the high-pressure EGR amount is increased with insufficient consideration, a problem arises that emission performance degrades when accelerating the engine from the idle operation (particularly when accelerating the engine in the start of the vehicle). On the other hand, if the fuel injection amount is reduced so that the emission performance does not degrade when accelerating the engine, the engine acceleration performance degrades.

Therefore, in this embodiment, when the gear range of the automatic transmission inputted from the transmission controller 115 indicates a non-travel range (when a gear position is a non-travel position in the idle operation of the engine 1), the control unit 100 performs an EGR amount increase control in which the high-pressure EGR valve 73 is controlled to increase the high-pressure EGR amount to be higher than when the gear range is a travel range (when the gear position is a travel position).

Specifically, when the gear range is a travel range (e.g., D-range or R-range) with a high possibility of the engine acceleration (high possibility of the vehicle start), the emission performance and the engine acceleration performance are prioritized and the opening of the high-pressure EGR valve 73 is controlled so that the high-pressure EGR amount is adjusted to the target high-pressure EGR amount set at S9. Hereinafter, such a control is referred to as the "normal high-pressure EGR control."

On the other hand, when the gear range is a non-travel range (P-range, N-range) with a low possibility of the engine acceleration (low possibility of the vehicle start), the heating performance is prioritized and the EGR amount increase control is performed. Specifically, the target high-pressure EGR amount set at S9 is increased and the opening of the high-pressure EGR valve 73 is controlled so that the high-pressure EGR amount becomes the increased target high-pressure EGR amount. By the EGR amount increase control, the heat release rate to the exhaust system is reduced to increase the temperature of the coolant for the engine 1, and thus, the heating performance is improved.

Figure 5:
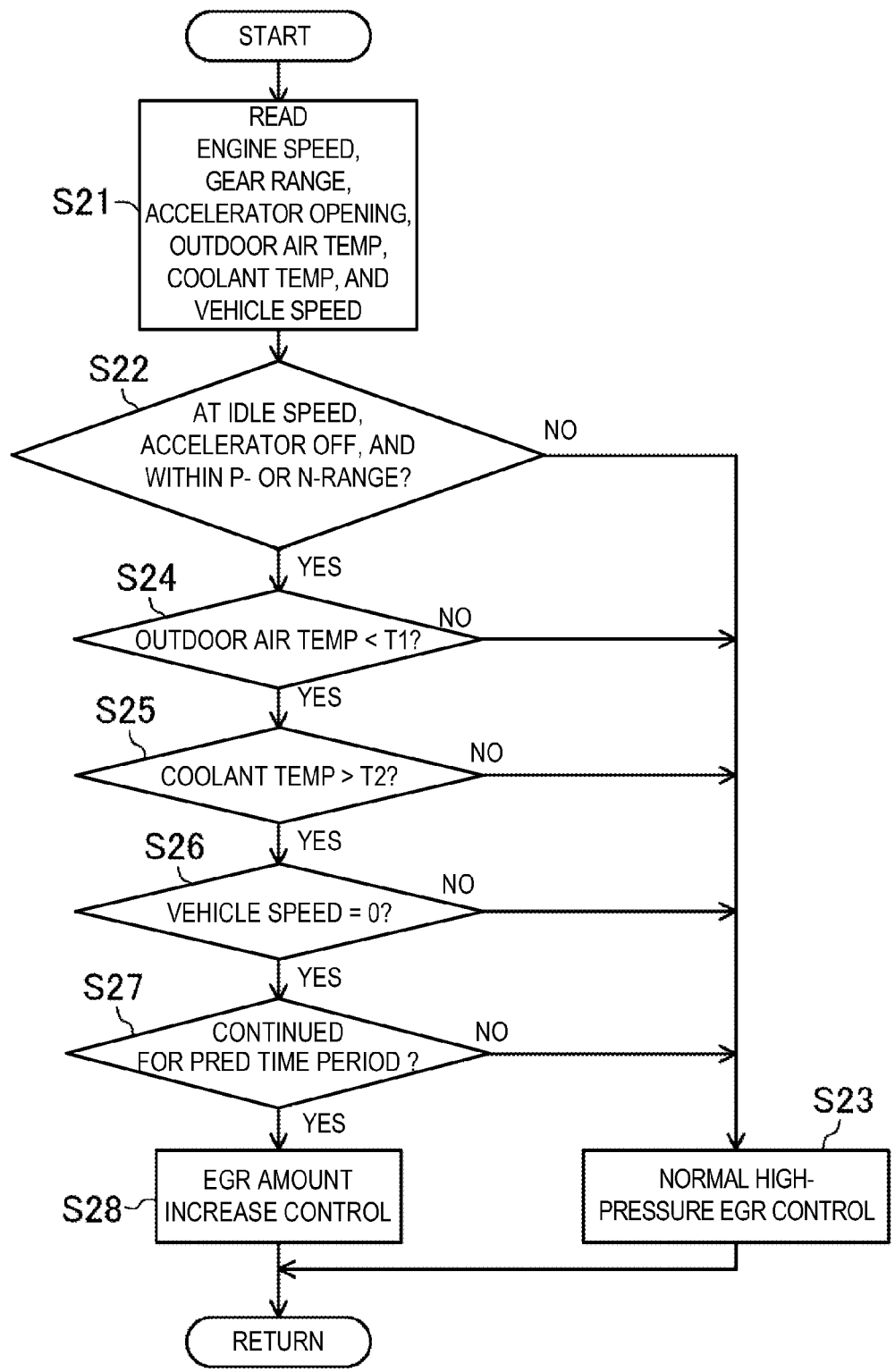
FIG. 5 is a flowchart illustrating a control of a high-pressure EGR amount performed by the control unit during an idle operation.

The control of the high-pressure EGR amount during the idle operation performed by the control unit 100 is described based on the flowchart of FIG. 5.

That is, first at S21, the engine speed is read from the engine speed sensor 101, the gear range of the automatic transmission is read from the transmission controller 115, the accelerator opening is read from the accelerator opening sensor 110, the intake temperature (i.e., outdoor air temperature) is read from the intake temperature sensor 103, the temperature of the coolant for the engine 1 (hereinafter, referred to as the "coolant temperature") is read from the engine coolant temperature sensor 108, and the vehicle speed is read from the vehicle speed sensor 111.

Next, at S22, it is determined whether the engine speed is an idle speed, the accelerator is in an off state (the opening of the accelerator is zero), and the gear range is either one of the P- and N-ranges.

If the result of the determination at S22 is negative, the routine proceeds to S23 where the normal high-pressure EGR control is performed, and then returns to the start of the routine. On the other hand, if the result of the determination at S22 is positive, the routine proceeds to S24.

At S24, whether the outdoor air temperature is lower than a predetermined temperature T1 is determined. The predetermined temperature T1 is set such that if the outdoor air temperature is higher than the predetermined temperature T1, a significant problem does not arise regarding the heating performance even without the EGR amount increase, in other words, even if the normal high-pressure EGR control is performed (e.g., between −10° C. and 0° C.).

If the result of the determination at S24 is negative, the routine proceeds to S23 where the normal high-pressure EGR control is performed, and then returns to the start of the routine. Specifically, when the outdoor air temperature is higher than the predetermined temperature T1 during the idle operation of the engine 1, the control unit 100 does not perform the EGR amount increase control even if the gear range is the non-travel range. On the other hand, if the result of the determination at S24 is positive, the routine proceeds to S25.

At S25, whether the coolant temperature is higher than a predetermined temperature T2 is determined. The predetermined temperature T2 is set such that if the EGR amount increase control is performed while the coolant temperature is the predetermined temperature T2 or lower, the combustion stability of the engine 1 degrades (e.g., between 40° C. and 50° C.).

If the result of the determination at S25 is negative, the routine proceeds to S23 where the normal high-pressure EGR control is performed, and then returns to the start of the routine. Specifically, when the coolant temperature is the predetermined temperature T2 or lower during the idle operation of the engine 1, the control unit 100 does not perform the EGR amount increase control even if the gear range is the non-travel range. On the other hand, if the result of the determination at S25 is positive, the routine proceeds to S26.

At S26, whether the vehicle speed is zero is determined. If the result of the determination at S26 is negative, the routine proceeds to S23 where the normal high-pressure EGR control is performed, and then returns to the start of the routine. Specifically, when the vehicle is not confirmed to be stopped by the vehicle speed sensor 111 (when the vehicle speed is not zero) during the idle operation of the engine 1, the control unit 100 does not perform the EGR amount increase control even if the gear range is the non-travel range. On the other hand, if the result of the determination at S26 is positive, the routine proceeds to S27.

At S27, whether the engine speed has been the idle speed, the accelerator has been in the off state (the opening of the accelerator is zero), and the gear range has been the either one of the P- and N-ranges continuously for a predetermined period of time are determined. The predetermined time period varies depending on the emission amount of the engine 1 (the heat generation during the idle operation) and is set such that the heating performance degrades after the predetermined time period has lapsed since entering into the above state. In a case where the heating performance has a high possibility of degrading once entering into the above state, the predetermined time period may be zero. Note that also in this case, the predetermined time period is preferably set such that the operating state of the engine 1 since entering into the above state (e.g., one second) is stabilized.

If the result of the determination at S27 is negative, the routine proceeds to S23 where the normal high-pressure EGR control is performed, and then returns to the start of the routine. On the other hand, if the result of the determination at S27 is positive, the routine proceeds to S28 where the EGR amount increase control is performed, and then returns to the start of the routine.

In this embodiment, the low-pressure EGR valve 83, the exhaust shutter valve 43, and the high-pressure EGR valve 73 configure an EGR amount adjuster for adjusting the EGR amount, in which the low-pressure EGR valve 83 and the exhaust shutter valve 43 configure a low-pressure EGR amount adjuster for adjusting the low-pressure EGR amount, and the high-pressure EGR valve 73 configures a high-pressure EGR amount adjuster for adjusting the high-pressure EGR amount. Moreover, the control unit 100 configures an adjuster controller for controlling the EGR amount (the low-pressure EGR amount and the high-pressure EGR amount) by controlling the EGR amount adjuster (the low-pressure EGR amount adjuster and the high-pressure EGR amount adjuster). Further, the transmission controller 115 (or the inhibitor switch) configures a gear position detector for detecting the gear position of the transmission of the vehicle, the intake temperature sensor 103 configures an outdoor air temperature detector for detecting the outdoor air temperature, the engine coolant temperature sensor 108 configures an engine coolant temperature detector for detecting the temperature of the coolant for the engine 1, and the vehicle speed sensor 111 configures a vehicle stop determiner for determining whether the vehicle is stopped.

Therefore, in this embodiment, during the idle operation of the engine 1, the exhaust gas is recirculated to the intake passage 30 only by the high-pressure EGR passage 71 and, when the gear range is the non-travel range, the high-pressure EGR amount is increased compared to when the gear range is the travel range. Therefore, when the engine is accelerated (the vehicle is started) from the idle operation while the gear range is the travel range with a high possibility of the engine acceleration (high possibility of the vehicle start), the degradation in the emission performance and the engine acceleration performance when accelerating the engine can be reduced. On the other hand, in the idle operation while the gear range is the non-travel range, since the possibility of the engine acceleration (the possibility of the vehicle start) is low, the heating performance is prioritized and the EGR amount increase control is performed. Thus, the heating performance can be improved. Particularly in a situation where the vehicle is stopped and a person on board rests inside the cabin in wintertime, since the gear position is generally set to the non-travel position, even if the vehicle is in the idle operation for a while, sufficient heating performance can be secured and the person on board can rest comfortably inside the cabin.

The present invention is not limited to this embodiment, and any substitution may be adopted within the spirit and scope of the claims.

For example, in this embodiment, during the idle operation of the engine 1, the exhaust gas is recirculated to the intake passage 30 only by the high-pressure EGR passage 71 and, when the gear range is the non-travel range, the high-pressure EGR amount is increased compared to when the gear range is the travel range; however, the exhaust gas may be recirculated to the intake passage 30 by both of the high-pressure EGR passage 71 and the low-pressure EGR passage 81 during the idle operation of the engine 1. In this case, when the gear range is the non-travel range, although the high-pressure EGR amount is preferably increased compared to when the gear range is the travel range, the total EGR amount including the high-pressure EGR amount and the low-pressure EGR amount may be increased. Moreover, during the idle operation of the engine 1, the exhaust gas may be recirculated to the intake passage 30 only by the low-pressure EGR passage 81. In this case, when the gear range is the non-travel range, the low-pressure EGR amount is increased compared to when the gear range is the travel range.

Moreover, in this embodiment, the high-pressure EGR passage 71 and the low-pressure EGR passage 81 are formed as the EGR passages; however, even if only a single EGR passage (especially the high-pressure EGR passage 71) is formed, the present invention can be applied.

Furthermore, in this embodiment, the engine 1 is mounted on the vehicle including the automatic transmission; however, the engine 1 may be mounted on a vehicle including a manual transmission. In this case, a gear position detecting switch (gear position detector) for detecting a gear position of the manual transmission is provided, and when the gear position detected by the gear position detecting switch is a non-travel position (neutral position), the EGR amount is increased compared to when the gear position is a travel position (e.g., first gear position).

This embodiment is merely an illustration, and therefore, it must not be interpreted in a limited way. The scope of the present invention is defined by the following claims. All modifications and changes falling under the equivalent range of the claims are within the scope of the present invention.

The present invention is useful for exhaust gas recirculation control devices for engines which include an EGR passage connecting an exhaust passage with an intake passage of the engine, an EGR amount adjuster for adjusting an EGR amount which is a recirculation amount of exhaust gas of the engine 1 through the EGR passage, and an adjuster controller for controlling the EGR amount by controlling the EGR amount adjuster.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE CHARACTERS

1 Engine
30 Intake Passage
40 Exhaust Passage
43 Exhaust Shutter Valve (EGR Amount Adjuster) (Low-pressure EGR Amount Adjuster)
61 Exhaust Turbocharger
61*a* Compressor
61*b* Turbine
71 High-pressure EGR Passage
73 High-pressure EGR Valve (EGR Amount Adjuster) (High-pressure EGR Amount Adjuster)
81 Low-pressure EGR Passage
83 Low-pressure EGR Valve (EGR Amount Adjuster) (Low-pressure EGR Amount Adjuster)
100 Control Unit (Adjuster Controller)
103 Intake Temperature Sensor (Outdoor Air Temperature Detector)
108 Engine Coolant Temperature Sensor (Engine Coolant Temperature Detector)
111 Vehicle Speed Sensor (Vehicle Stop Determiner)
115 Transmission Controller (Gear Position Detector)

What is claimed is:

1. An exhaust gas recirculation (EGR) control device for an engine in a vehicle, comprising:
   an EGR system connecting an exhaust passage of the engine with an intake passage of the engine;
   an EGR amount adjuster for adjusting an EGR amount that is a recirculation amount of exhaust gas of the engine through the EGR system;
   an adjuster controller for controlling the EGR amount adjuster to adjust the EGR amount; and
   a gear position detector for detecting a gear position of an automatic transmission of a vehicle on which the engine is mounted, the gear position being selected from a travel position and a non-travel position, the non-travel position being selected from Neutral and Park positions of the automatic transmission, and the travel position being selected from a gear position of the automatic transmission other than the Neutral and Park positions, wherein when the gear position detected by the gear position detector during an idle operation of the engine is the non-travel position, the adjuster controller performs an EGR amount increase control in which the EGR amount adjuster is controlled to increase the EGR amount to be higher than when the gear position is the travel position, a turbine of an exhaust turbocharger is disposed in the exhaust passage, a compressor of the exhaust turbocharger is disposed in the intake passage, the EGR system includes:
- a high-pressure EGR passage connecting the exhaust passage at a position upstream of the turbine, with the intake passage at a position downstream of the compressor, the high-pressure EGR passage being configured to recirculate high-temperature exhaust gas; and
- a low-pressure EGR passage connecting the exhaust passage at a position downstream of the turbine, with the intake passage at a position upstream of the compressor, the low-pressure EGR passage being configured to recirculate low-temperature exhaust gas that is lower in temperature than the high-temperature exhaust gas, the EGR amount adjuster includes:
- a high-pressure EGR valve for adjusting a high-temperature high-pressure EGR amount that is a recirculation amount of the exhaust gas of the engine through the high-pressure EGR passage; and
- a low-pressure EGR valve for adjusting a low-pressure EGR amount that is a recirculation amount of the exhaust gas of the engine through the low-pressure EGR passage, during the idle operation of the engine, the adjuster controller controls the high-pressure and low-pressure EGR valves to recirculate the exhaust gas only by the high-pressure EGR passage, and in the EGR amount increase control, when the gear position detected by the gear position detector is the non-travel position during the idle operation of the engine, the high-pressure EGR valve is controlled to increase the high-temperature high-pressure EGR amount to be larger than a target high-pressure EGR amount that is set at the gear position in the travel position so as to heat a coolant for the engine that is supplied to a heater core.

2. The device of claim 1, further comprising an outdoor air temperature detector for detecting a temperature of outdoor air,
   wherein when the temperature of the outdoor air detected by the outdoor air temperature detector is higher than a predetermined temperature during the idle operation of the engine, the adjuster controller does not perform the EGR amount increase control even when the gear position detected by the gear position detector is the non-travel position.

3. The device of claim 1, further comprising an engine coolant temperature detector for detecting a temperature of the coolant for the engine,
   wherein when the temperature of the coolant detected by the engine coolant temperature detector is lower than a predetermined temperature during the idle operation of the engine, the adjuster controller does not perform the EGR amount increase control even when the gear position detected by the gear position detector is the non-travel position.

4. The device of claim 1, further comprising a vehicle stop determiner for determining whether the vehicle is stopped,
   wherein when the vehicle is not determined as stopped by the vehicle stop determiner, the adjuster controller does not perform the EGR amount increase control even when the gear position detected by the gear position detector is the non-travel position.

* * * * *